(12) United States Patent
Akahori et al.

(10) Patent No.: US 6,868,180 B2
(45) Date of Patent: Mar. 15, 2005

(54) IMAGE PROCESSING APPARATUS, IMAGE FORMING APPARATUS, AND IMAGE PROCESSING METHOD

(75) Inventors: Taisuke Akahori, Toyokawa (JP); Hiroyuki Suzuki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 593 days.

(21) Appl. No.: 10/051,244

(22) Filed: Jan. 22, 2002

(65) Prior Publication Data

US 2002/0136463 A1 Sep. 26, 2002

(30) Foreign Application Priority Data

Jan. 24, 2001 (JP) ........................................ 2001-015520

(51) Int. Cl.[7] .......................... G06K 9/00; H04N 1/405
(52) U.S. Cl. ...................... 382/167; 382/260; 358/3.06
(58) Field of Search ................................ 382/162, 167, 382/260, 263, 266, 274, 275; 358/1.9, 3.06, 3.15

(56) References Cited

U.S. PATENT DOCUMENTS 5,696,842 A * 12/1997 Shirasawa et al. .......... 382/176
6,449,060 B1 * 9/2002 Kawai et al. ................ 358/1.9
6,753,976 B1 * 6/2004 Torpey et al. ............... 358/2.1

FOREIGN PATENT DOCUMENTS

JP 07-264399 10/1995
JP 08-181864 7/1996
JP 2000-175032 6/2000

OTHER PUBLICATIONS

U.S. Appl. No. 09/369,176; "Halftone Dot Image Discrimination Method and Image Processing Device".
U.S. Appl. No. 09/568,669; "Image Processing Apparatus, Image Processing Method and Computer Program Product for Image Processing".

* cited by examiner

*Primary Examiner*—Kanjibhai Patel
(74) *Attorney, Agent, or Firm*—Burns, Doane, Swecker & Mathis, L.L.P.

(57) ABSTRACT

Disclosed are an image processing apparatus, an image processing method, and an image forming apparatus utilizing the image processing apparatus that can decrease deterioration of image quality even when misjudgment occurs in judging a type of an image, such as a halftone-dot area and an edge area of a character, when performing predetermined image processing on the image. When an area judgment unit 440 judges that a target pixel is in an edge area of a character that is present on a halftone-dot area (when any one of signals S17 to S20 is "high"), an operation of image processing to be performed on the target pixel is switched in accordance with whether the target pixel is a color pixel or not and whether the halftone-dot area is a color area or not.

18 Claims, 8 Drawing Sheets

Fig.6

| V11 | V12 | V13 | V14 | V15 |
|-----|-----|-----|-----|-----|
| V21 | V22 | V23 | V24 | V25 |
| V31 | V32 | V33 | V34 | V35 |
| V41 | V42 | V43 | V44 | V45 |
| V51 | V52 | V53 | V54 | V55 |

IMAGE PROCESSING APPARATUS, IMAGE FORMING APPARATUS, AND IMAGE PROCESSING METHOD

This application is based on Patent Application No.2001-15520 filed in Japan, the content of which is hereby incorporated by reference.

This application relates to U.S. patent application Ser. No. 09/369,176, entitled "HALFTONE DOT IMAGE DISCRIMINATION METHOD AND IMAGE PROCESSING DEVICE", owned by the assignee of this application and incorporated herein by reference.

BACKGROUND OF THE INVENTION (1) Field of the Invention

The present invention relates to an image processing apparatus, and particularly to a technique for decreasing deterioration of image quality in an image forming apparatus that forms an image based on digital image data.

(2) Description of Related Art

In image forming apparatuses that form an image based on digital image data, various image processing such as smoothing and edge enhancement is generally employed to improve image quality. Such image processing is performed on pixels of an image in accordance with an image type, examples of which include a character image and a halftone-dot image.

However, conventional image processing apparatuses have the problem that an image type may be misjudged and then image processing that is not supposed to be performed may be performed on the image, causing image quality to be deteriorated. Such misjudgment often occurs in pixels that come in contact with an edge area of a character when a character image is present on a halftone-dot area.

SUMMARY OF THE INVENTION

In view of the above problem, the object of the present invention is to provide an image processing apparatus that can decrease deterioration of image quality when misjudgment of an image type occurs, and to provide an image forming apparatus that includes the image processing apparatus, and an image processing method.

The above object can be achieved by an image processing apparatus including: an acquisition unit for acquiring image data that includes a plurality of pixels, each of which is set as a target pixel to be judged; a color pixel judgment unit for judging whether the target pixel is a color pixel, the color pixel being a pixel other than a monochrome pixel; a color area judgment unit for judging whether the target pixel is in a color area that includes a plurality of color pixels, by referring to a judgment result of the color pixel judgment unit; a character-halftone judgment unit for judging whether the target pixel is in an edge area of a character that is present on a halftone-dot area; and a switch unit for switching, when a judgment result of the character-halftone judgment unit is affirmative, an operation of image processing to be performed on the target pixel in accordance with a judgment result of the color pixel judgment unit and a judgment result of the color area judgment unit.

According to this construction, an operation of image processing to be performed on a target pixel is switched in accordance with whether the target pixel is a color pixel or not, and whether the target pixel is in a color area or not, when the target pixel is judged to be in an edge area of a character that is present on a halftone-dot area. This can decrease deterioration of image quality when misjudgment of an image type occurs.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 6 shows an example case showing a window of 5*5 pixels set for a target pixel V33;

DESCRIPTION OF THE PREFERRED EMBODIMENT

The following describes a preferred embodiment of an image processing apparatus and an image forming apparatus relating to the present invention, with reference to the drawings.

(1) Overall Construction of the Image Processing Apparatus

Figure 1:
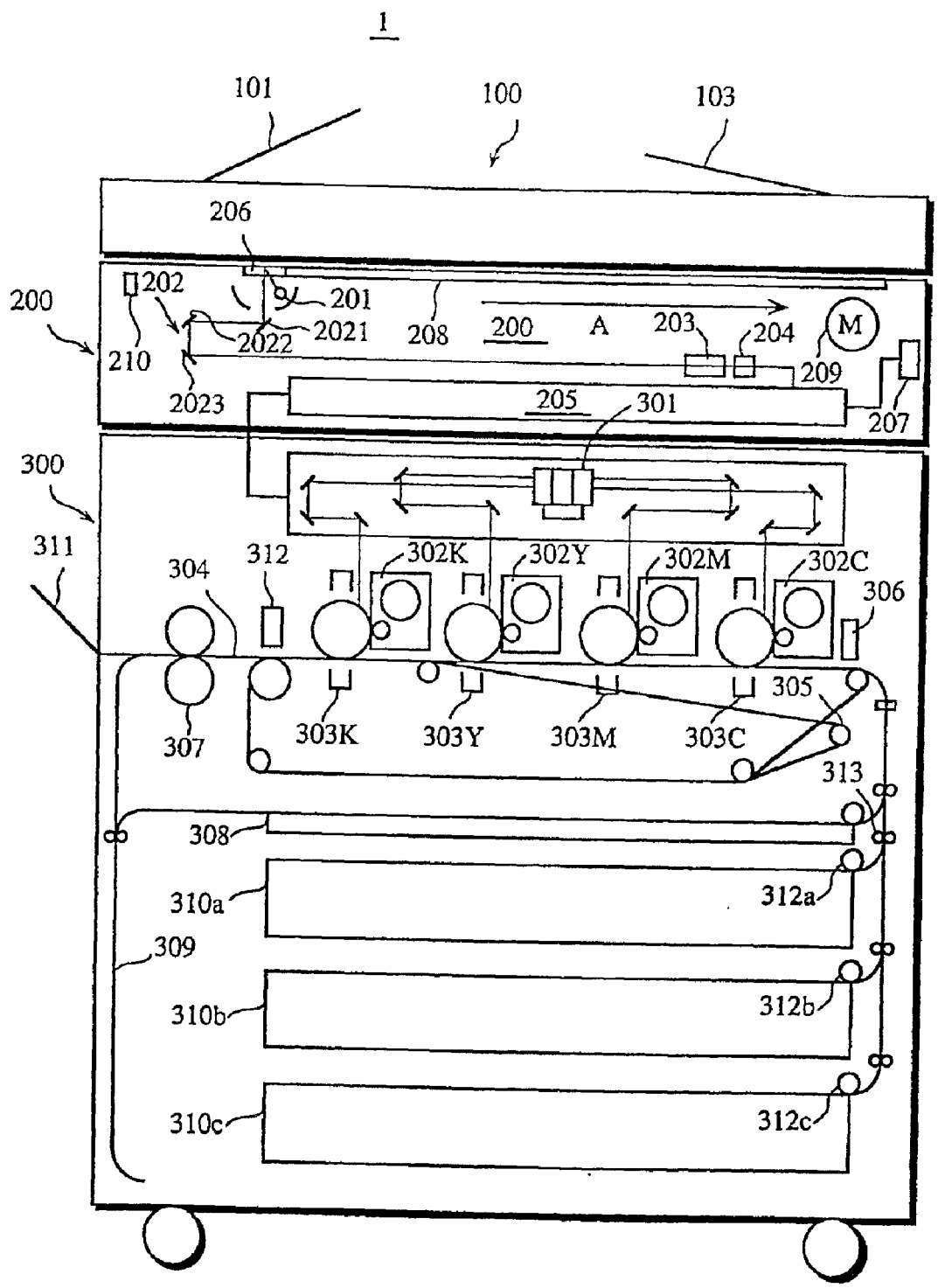
FIG. 1 is a schematic cross sectional view showing the overall construction of a copying machine 1.

FIG. 1 is a schematic cross sectional view showing the overall construction of a full-color copying machine (hereafter simply referred to as a "copying machine") as one example of the image forming apparatus.

In a copying machine 1, an image forming unit 300 forms an image based on digital image data obtained by an image reading unit 200 reading a document. An automatic document feeder 100 is provided on the image reading unit 200. Here, an image is typically formed in the following way. A document is fed to an image reading position by the automatic document feeder 100 and is read by the image reading unit 200, and the obtained image data is transmitted to the image forming unit 300, which forms the image on a recording sheet. The copying machine 1 can be connected to external devices, such as a personal computer (PC), via an interface 207. This connection provides the copying machine 1 with additional features such as (a) scanner function for outputting image data read by the image reading unit 200 to an external device, and (b) printer function for receiving input of image data from an external device and forming an image by the image forming unit 300, based on the input image data.

The automatic document feeder 100 feeds a document set on a document feed tray 101 to the image reading position of the image reading unit 200, and after the image is read, discharges the document to a document discharge tray 103. The document transportation operation is accomplished in accordance with instructions from an operation panel (not shown), and the document discharge operation is accomplished in accordance with a reading end signal from the image reading unit 200. When a plurality of documents are stacked on the document feed tray 101, these control signals are continuously generated to sequentially transport the documents, read images of the documents, and discharge the documents.

In the image reading unit 200, an exposure lamp 201 illuminates the document placed on a document glass 208, and a mirror group 202 including three mirrors 2021 to 2023 and a lens 203 direct the light reflected by the document to form an image on a CCD sensor 204. The exposure lamp 201 and the first mirror 2021 are driven by a scan motor 209 in the direction of arrow A at a speed V corresponding to the magnification ratio, so as to scan the entire surface of the document placed on the document glass 208. While the document is being scanned using the exposure lamp 201 and the first mirror 2021, the second mirror 2022 and the third mirror 2023 move in the direction of arrow A at a speed V/2. The position of the exposure lamp 201 is calculated and controlled, using the amount of movement from the home position, i.e., using the number of steps of the scan motor 209 and detection signals from a scan home position sensor 210. The reflected light entering the CCD sensor 204 is converted into electric signals within the CCD sensor 204. The image processing unit 205 then subjects the electric signals to various image processing, such as analogue processing, analogue-to-digital (AD) conversion, and digital image processing, and then transmits the signals to the interface 207 or to the image forming unit 300. A white shading correction plate 206 is arranged in close proximity to the document reading start position of the document glass 208. Prior to reading of the document, the shading correction plate 206 is read to generate correction data for shading correction.

Next, the following describes the image forming unit 300. First, exposure and imaging are described.

Image data transmitted from the image reading unit 200 or the interface 207 is converted into print data of each of colors C (cyan), M (magenta), Y (yellow), and K (black), and is transmitted to a control unit of each exposure head (not shown). The control unit of each exposure head makes a laser emit a laser beam in accordance with a pixel value of the transmitted image data, and performs a one-dimensional scan with the emitted laser beam via a polygon mirror 301, to optically expose the surface of a photoconductor in each of the imaging units 302C, 302M, 302Y, and 302K.

In each of the imaging units 302C to 302K, elements required for an electrophotographic process are arranged around the periphery of a photoconductor. The electrophotographic process is continuously performed as the photoconductor for each of C, M, Y, and K is rotated clockwise. The imaging units 302C to 302K necessary for forming an image each are integrated, and are detachable from the body. The latent images formed on the photoconductors in the imaging units 302C to 302K by the above exposure are developed by developing units of respective colors. The toner images developed on the surface of the photoconductors in the imaging units 302C to 302K are transferred onto a recording sheet transported on a paper transport belt 304, by transfer chargers 303C to 303K respectively arranged to face the photoconductors in the imaging units 302C to 302K within the paper transport belt 304.

The following describes the recording sheet feeding, transport, and fixing operations. The recording sheet onto which an image is to be transferred is fed to the transfer position in the following sequence and the image is formed on the recording sheet. Recording sheets of various sizes are loaded beforehand in paper feed cassettes 310a to 310c. A recording sheet of a desired size is fed to the transport path by a corresponding one of the paper feed rollers 312a to 312c respectively mounted on the paper feed cassettes 310a to 310c.

The recording sheet fed to the transport path is transported onto the paper transport belt 304 by a transport roller pair 313. Here, a reference mark on the paper transport belt 304 is detected by a timing sensor 306, so that a transport timing of the recording sheet is adjusted. Also, in the imaging units 302C to 302K, three registration correction sensors 312 are arranged along the main scanning direction furthest downstream in the direction of the transportation of the recording sheet. When a registration pattern is formed on the paper transport belt 304, the amount of color aberration is detected in the main scanning direction and the sub scanning direction of the C, M, Y, and K images by the registration correction sensors 312. Print image correction and image distortion correction are performed by a print image control unit (PIC unit). As a result, color aberration on the recording sheet can be prevented. The toner image transferred onto the recording sheet is fused and fixed thereon via heating by the fixing roller pair 307, and then the recording sheet is discharged to a discharge tray 311.

Note that in the case of duplex copies, an image is formed on the back side of the recording sheet in the following way. The recording sheet on which the toner image is fixed by the fixing roller pair 307 is inverted by a paper inverting unit 309, and is guided to a duplex unit 308, which re-feeds the recording sheet to the transport path. Note also that the paper transport belt 304 can be retracted from the imaging units 302C, 302M, and 302Y of colors C, M, and Y, by up and down movement of a belt retracting roller 305, so as not to contact the photoconductors therein. When a monochrome image is formed, therefore, the imaging units 302C, 302M, and 302Y are not driven. This can decrease wear of the photoconductors and the other components in the imaging units 302C, 302M, and 302Y.

(2) Construction of the Image Processing Unit 205

Figure 2:
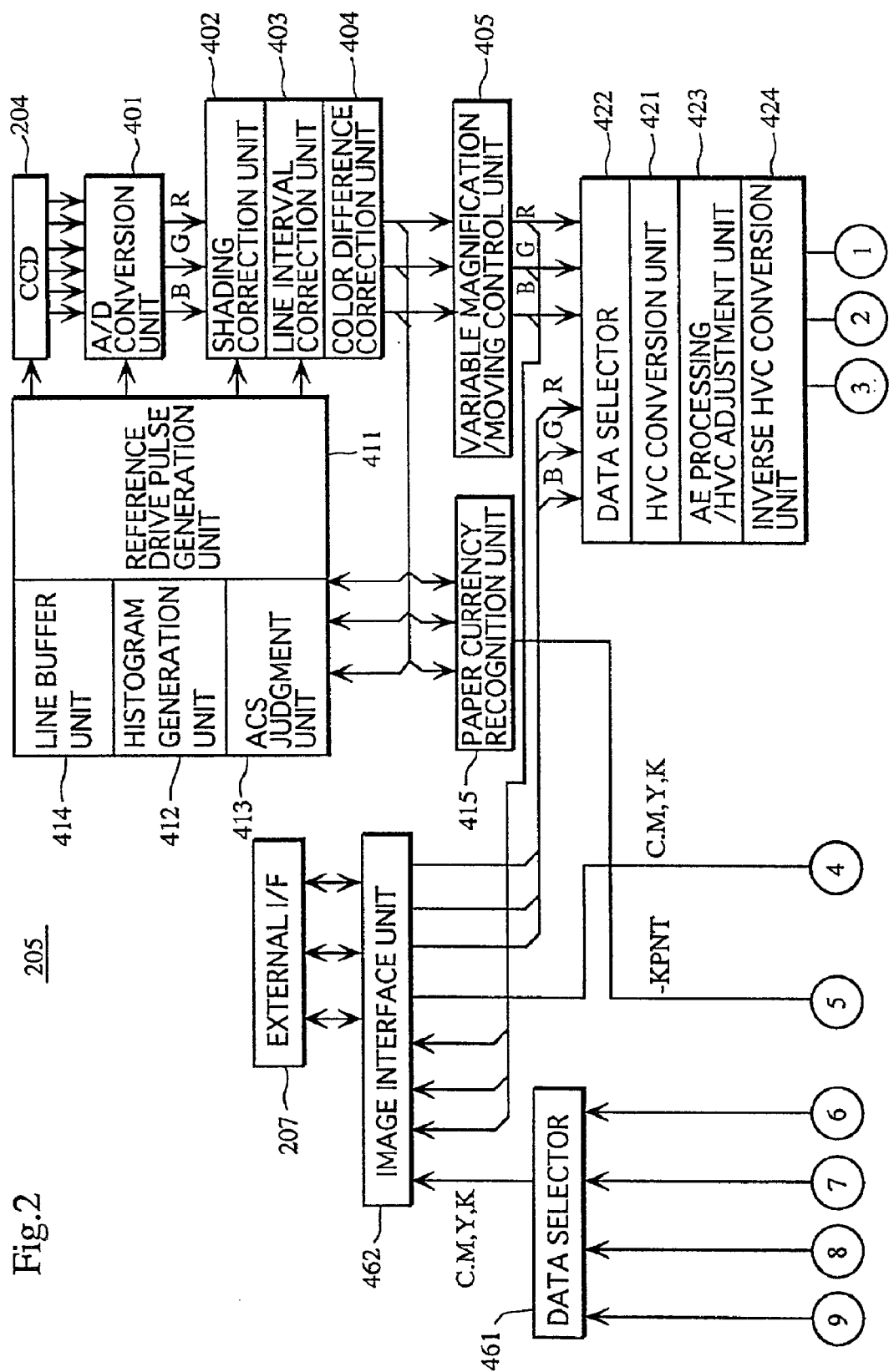
FIG. 2 is a functional block diagram showing the construction of an image processing unit 205.
Figure 3:
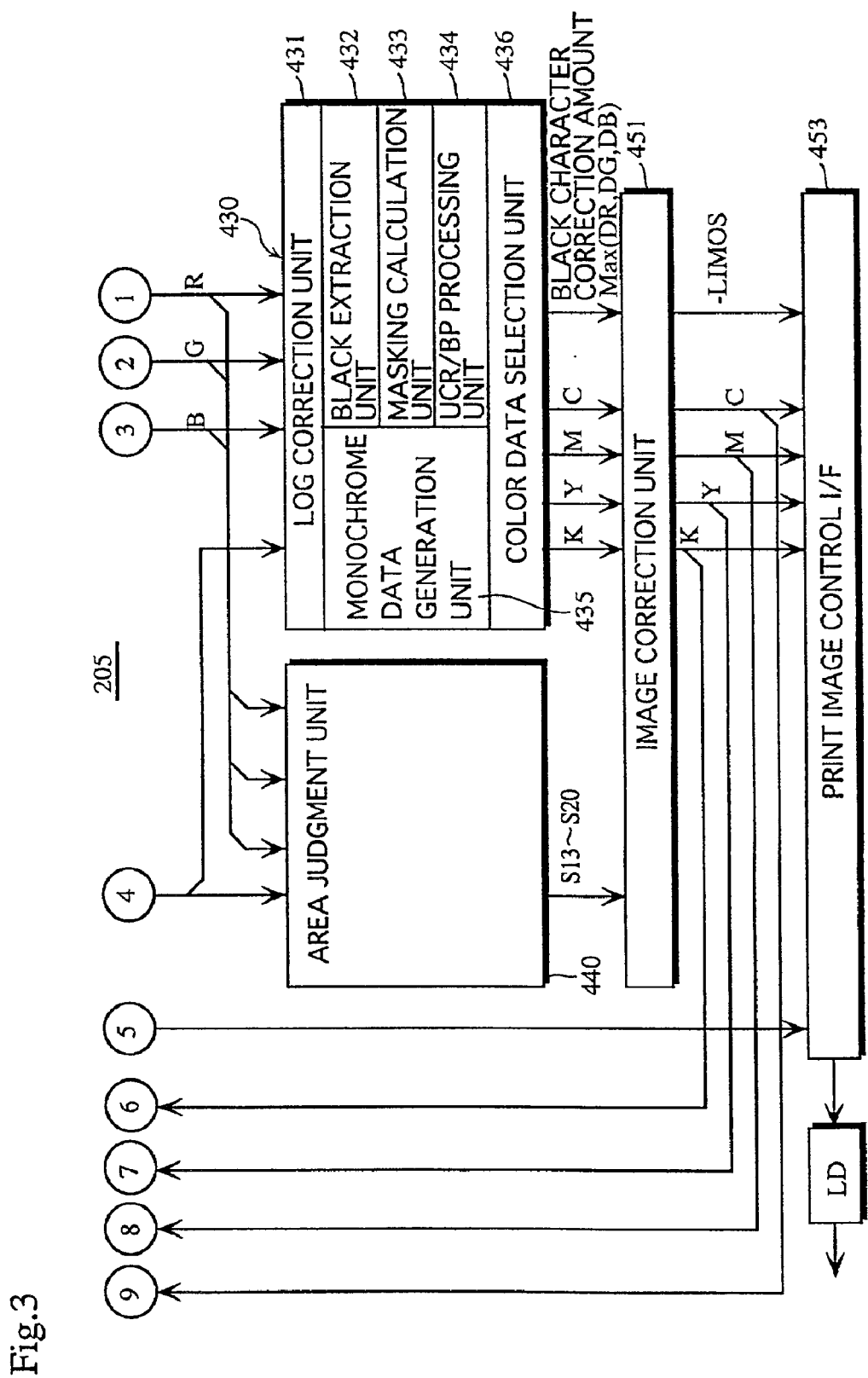
FIG. 3 is a functional block diagram showing the construction of the image processing unit 205.

The following describes the signal processing performed by the image processing unit 205 provided in the image reading unit 200. FIGS. 2 and 3 are functional block diagrams showing the construction of the image processing unit 205.

The CCD sensor 204 shown in FIG. 2 converts the document image into electric signals separated into respective colors of R, G, and B in accordance with the intensity of the light reflected from the surface of the document. The reading resolution of the CCD sensor 204 can be switched among 400 dpi, 600 dpi, 800 dpi, 1200 dpi, etc. An AD conversion unit 401 converts analogue signals outputted from the CCD sensor 204 into 8-bit digital data of 256 gradations for the R, G, and B information, based on a timing signal outputted from a reference drive pulse generation unit 411.

The shading correction unit 402 corrects the R, G, and B image data, to eliminate uneven light in the main scanning direction thereof. For the shading correction, data obtained by reading the shading correction plate 206 for each color is independently stored in an internal shading memory as reference data. More specifically, the correction can be accomplished by converting reciprocally the reference data and multiplying the reciprocally converted data and the image data together when the document is scanned.

The line interval correction unit 403 aligns the reading position in the scanning direction of sensor chips of respective colors, R, G, and B, by delaying the image data of each color in line units using the internal field memory, in accordance with the scanning speed.

Due to the color difference phenomenon caused by an optical lens, the R, G, and B reading phase difference increases more as closer to the edge part of the document on the main scanning side. This may cause not only color aberration but also misjudgment in an ACS judgment which is described later. In view of this, a color difference correction unit 404 corrects the R, G, and B phase difference based on chroma information.

A variable magnification/moving control unit 405 performs magnification/moving processing in the main scanning direction by using two magnification line memories for each of the R, G, and B image data and alternately inputting and outputting each one line while independently controlling the read/write timing. To be more specific, the variable magnification/moving control unit 405 accomplishes reduction by culling data when writing it to memory, and enlargement by diluting data when reading it from memory. In these controls, to prevent image loss and to decrease image coarseness, the variable magnification/moving control unit 405 performs an interpolation process on the data before writing it to memory for reduction and after reading it from memory for enlargement. These block control and scan control are combined not only for reduction and enlargement, but also for centering, image repeat, bound reduction, and the like.

A histogram generation unit 412 generates brightness data from the R, G, and B image data obtained by a preliminary scan, prior to operation for copying the document. The histogram generation unit 412 then generates a histogram of the brightness data in memory. An automatic color selection (ACS) judgment unit 413 judges whether each dot is a color dot or not with reference to the chroma data. The ACS judgment unit 413 then generates, in memory, information showing the number of color dots in each 512*512 dot square mesh on a document. Based on the generated information, the ACS judgment unit 413 performs a copy background level automatic control (AE process) and a color or monochrome copy operation automatic color selection (ACS process).

A line buffer unit 414 has a memory that can store one line of the R, G, and B image data read by the image reading unit 200. The line buffer unit 414 monitors image data used for image analysis for automatic sensitivity correction of the CCD sensor 204 and automatic clamp correction of the AD conversion unit 401.

A paper currency recognition unit 415 prohibits a normal copy image from being formed when negotiable securities such as a paper currency are placed on the document glass 208 for copying. Specifically, the paper currency recognition unit 415 extracts a data area of R, G, and B image data and performs pattern matching to judge whether the document is a paper currency or not. When the document is judged to be a paper currency, the CPU controlling the reading operation of the image reading unit 200 and the image processing unit 205 immediately outputs a solid black print signal (-KPNT= "L") to the print image controller. The print image controller then switches the K data to solid black, so as to prohibit normal copying.

An HVC conversion unit 421 once converts the R, G, and B image data inputted via a data selector 422, into brightness (V data) and color difference signals (Cr and Cb data) via 3*3 matrix calculation.

Next, an AE processing unit 423 corrects the V data based on the above mentioned background level control value, and the Cr and Cb data in accordance with the chroma level and the hue level set on the operation panel. Following this, an inverse HVC conversion unit 424 converts the V data and the Cr and Cb data back into the R, G, and B image data via 3*3 inverse matrix calculation.

In a color correction unit 430 shown in FIG. 3, a LOG correction unit 431 first converts the R, G, and B data into density data (DR, DG, and DB data), and then a black extraction unit 432 detects the smallest color level of the DR, DG, and DB data as document background components, and also detects the gradient level difference between the maximum color and minimum color of DR, DG, and DB as document chroma data.

A masking calculation unit 433 then performs a 3*6 nonlinear matrix calculation process on the DR, DG, and DB data, to convert the data into color data (C, M, Y, and K data) matching the color toner of the printer.

A UCR/BP processing unit 434 calculates the UCR/BP coefficients corresponding to the document chroma data for the document background components (Min(R,G,B)), and determines the UCR/BP amount by a multiple process. The UCR/BP processing unit 434 then subtracts an amount of under color removal (UCR) from the C, M, and Y data after the masking calculation, and calculates the C, M, and Y data and the K data (BP amount). Also, a monochrome data generation unit 435 generates the brightness component from the R, G, and B data and performs the LOG correction on the brightness component, to output the black data (DV data). Finally, a color data selection unit 436 selects the C, M, Y, and K data for a color copy image, and the DV data (C, M, and Y are white) for a monochrome copy image.

An area judgment unit 440 judges, as to the R, G, and B image data inputted via the data selector 422, whether each pixel that constitutes the image is in an edge area of a character, in a halftone-dot area, in an edge area of a character that is present on a halftone-dot area, or not. When judging that a pixel is in an edge area of a character, the area judgment unit 440 also judges whether the pixel is a color pixel or not. Also, when judging that a pixel is in a halftone-dot area, or that a pixel is in an edge area of a character that is present on a halftone-dot area, the area judgment unit 440 also judges whether the halftone-dot area is a color area or not. The area judgment unit 440 then outputs area judgment signals S13 to S20 showing the judgment results. The construction of the area judgment unit 440 is described in detail later.

An image correction unit 451 performs correction processing such as edge enhancement and smoothing on the C, M, Y, and K data as necessary, based on the area judgment signals outputted from the area judgment unit 440. The correspondence between operations of the correction processing and area judgment signals is described in detail later. The image correction unit 451 then performs image correction on the C, M, Y, and K data in accordance with sharpness, color balance, and gamma level designated on the operation panel. Then, the image correction unit 451 transmits the gradation reproduction attribute signals (-LIMOS) to a print image control interface 453. Also, the image correction unit 451 transmits the C, M, Y, and K data to an image interface unit 462 via a data selector 461 shown in FIG. 2.

The image interface unit 462 inputs and outputs image data, to and from an external device. The image interface unit 462 enables the R, G, and B data to be inputted and outputted at the same time and also, the C, M, Y, and K data to be inputted and outputted sequentially. The image interface unit 462 thereby enables the external device to utilize the scanner function and the printer function of the copying machine 1.

(3) Construction of the Area Judgment Unit 440

Figure 4:
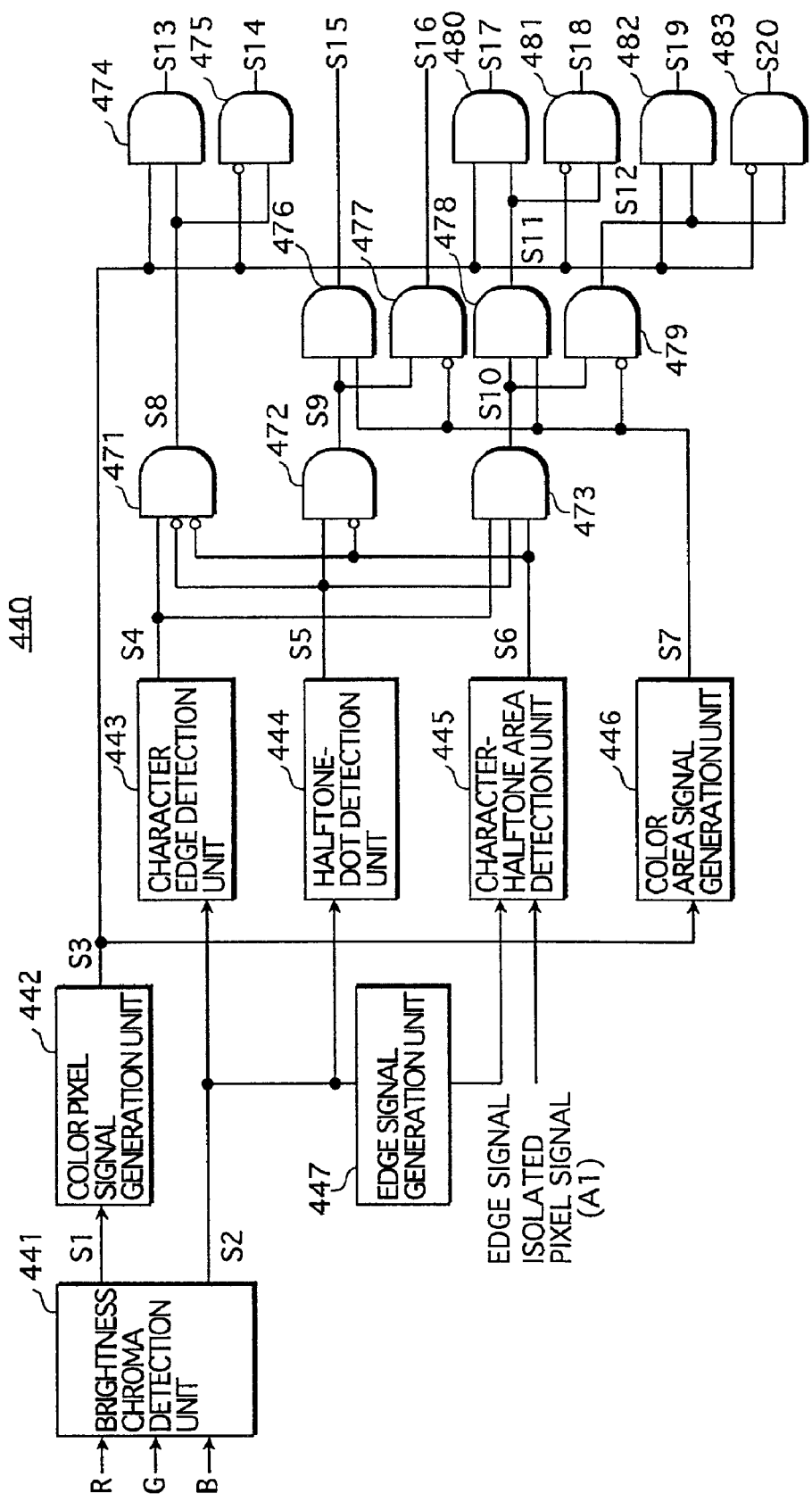
FIG. 4 shows the construction of an area judgment unit 440.

FIG. 4 shows the construction of the area judgment unit 440. The area judgment unit 440 judges an area to which a pixel belongs (a pixel to be judged is hereafter simply referred to as a "target pixel"), based on the R, G, and B data.

The area judgment unit 440 then outputs the area judgment signals S13 to S20 to the image correction unit 451. The image correction unit 451 performs correction processing such as edge enhancement and smoothing on the C, M, Y, and K data outputted from the color correction unit 430 as necessary, based on the area judgment signals S13 to S20.

The area judgment unit 440 includes a brightness chroma detection unit 441, a color pixel signal generation unit 442, a character edge detection unit 443, a halftone-dot detection unit 444, a character-halftone area detection unit 445, a color area signal generation unit 446, and an edge signal generation unit 447. A logical circuit processing the output of each unit results in the area judgment signals S13 to S20 being outputted. The following describes the operations of each unit in detail.

The brightness chroma detection unit 441 subjects the R, G, and B data (reflected light data) to the Lab conversion, so as to generate chroma (W) data S1 and brightness (L) data S2. Note that the chroma (W) can be calculated according to the following equation 1.

$$W = \sqrt{a^2 + b^2} \qquad \text{Equation 1}$$

The color pixel signal generation unit 442 compares the chroma (W) calculated using the above equation 1 with a predetermined threshold REF1. The color pixel signal generation unit 442 sets its output signal S3 at "high", when judging that the value (W) is above the REF1, and sets the output signal S3 at "low" in the other cases. The output signal S3 being "high" indicates that the target pixel is a color pixel.

The character edge detection unit 443 first sets a window of a predetermined size with a target pixel as the center, and calculates the edge amount from the brightness (L) data S2 generated by the brightness chroma detection unit 441 using a linear differential or a quadratic differential. The character edge detection unit 443 compares the calculated edge amount with a predetermined threshold REF2. The character edge detection unit 443 sets its output signal S4 at "high" when judging that the edge amount is above the REF2, and sets its output signal S4 at "low" in the other cases. The output signal S4 being "high" indicates that the target pixel is in an edge area of a character.

Figure 5:
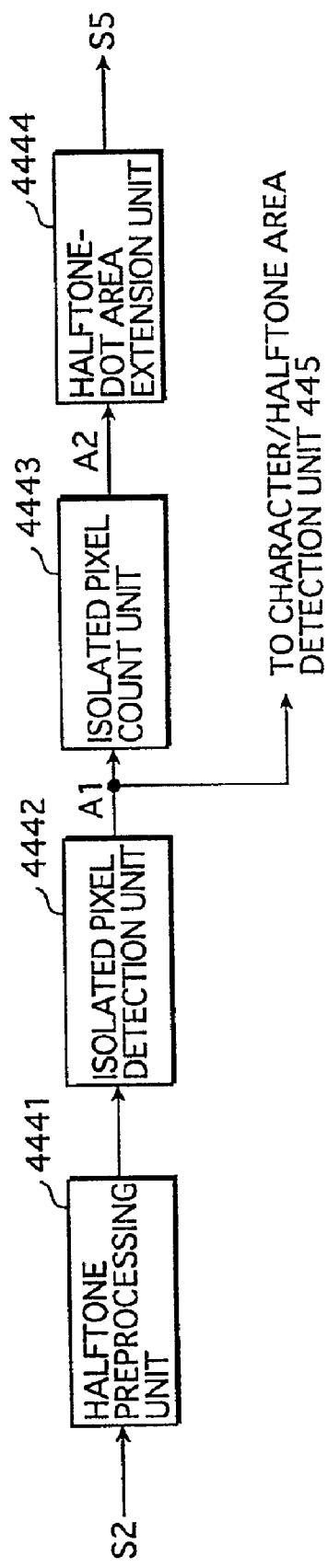
FIG. 5 is a functional block diagram showing the construction of a halftone-dot detection unit 444.

The halftone-dot detection unit 444 outputs a signal S5 indicating whether the target pixel is in a halftone-dot area or not. FIG. 5 is a functional block diagram showing the construction of the halftone-dot detection unit 444.

A halftone preprocessing unit 4441 subjects image data to such processing that decreases a size of a dot within a halftone-dot area included in the image data so as to be smaller than a mesh of an isolated pixel detection filter that is described later, in accordance with the resolution of the image data. To be more specific, the halftone preprocessing unit 4441 subjects brightness (L) data S2 to a pixel culling process so as to decrease the number of pixels thereof. The construction of the halftone preprocessing unit 4441 and the like is not described here as it is well known, and is described in U.S. patent application Ser. No. 09/369,176, which is incorporated by reference. Due to this pixel culling process, even when the image data has high resolution such as 600 dpi, the size of a dot within a halftone-dot area can be decreased to a size detectable by the same isolated pixel filter used when the image data has resolution of 400 dpi.

An isolated pixel detection unit 4442 sets a window of a predetermined size with a target pixel as the center, and judges whether the target pixel corresponds to an isolated pixel or not, based on the comparison result of brightness (L) data of the target pixel and brightness (L) data of nearby pixels. The following describes the operations in detail in a case where a window of 5*5 pixels is set as an isolated pixel filter, as shown in FIG. 6. Note that an example in FIG. 6 assumes that a pixel V33 is a target pixel, and that a judgment is performed as to whether the target pixel V33 corresponds to an isolated pixel, using brightness (L) data L33 of the target pixel V33, and brightness (L) data L11 to L15, and L21 to L25 of nearby pixels, i.e., pixels V11 to V15, and pixels V21 to V25, after the pixel culling process. As one example, the judgment as to whether the target pixel corresponds to an isolated pixel or not can be accomplished by judging whether the data L33 satisfies the following inequalities 2, 3, and 4.

Inequality 2

$$L33 > \text{MAX}\ (L22, L23, L24, L34, L44, L43, L42, L32)$$

Inequality 3

$$L33 > \text{MAX}\ (L11, L12, L13, L14, L15, L25, L35, L45, L55, L54, L53, L52, L51, L41, L31, L21)$$

Inequality 4

$$L33 > \text{MAX}\ [(L11+L22)/2, (L13+L23)/2, (L15+L24)/2, (L55+L44)/2, (L53+L43)/2, (L51+L42)/2]$$

When the above inequalities 2, 3, and 4 are satisfied, the target pixel V33 is judged to correspond to a white isolated pixel. A "white isolated pixel" is a pixel with high brightness that stands isolated in a background of pixels with low brightness. It should be noted here that one or more isolated pixels can construct one dot in a half tone-dot area. To judge whether the target pixel corresponds to a black isolated pixel (a pixel with low brightness that stands isolated in a background of pixels with high brightness) or not, the above inequalities 2, 3, and 4 in each of which the sign is inversed and MAX (maximum value) is replaced by MIN (minimum value) can be used. Note that all of the inequalities 2, 3, and 4 may not necessarily be satisfied, but the target pixel may be judged to correspond to an isolated pixel when at least one of the inequalities 2, 3, and 4 is satisfied. As one example, the target pixel may be judged to correspond to an isolated pixel when the inequalities 2 and 4 are satisfied. Various methods can be considered, such that a logical-OR of results of the inequalities 2 and 3 may be used for the judgment.

An isolated pixel count unit 4443 sets a window of a predetermined size with a target pixel as the center, and counts the number of white isolated pixels and black isolated pixels within the window, based on an output signal A1 of the isolated pixel detection unit 4442. The isolated pixel count unit 4443 then compares the larger one of (a) the count number of white points and (b) the count number of black points, with a predetermined threshold REF3. The isolated pixel count unit 4443 sets its output signal A2 at "high" when the number of the isolated pixels is above the threshold REF3, and sets its output signal A2 at "low" in the other cases. The output signal A2 being "high" indicates that the target pixel is in a halftone-dot area.

Figure 7:
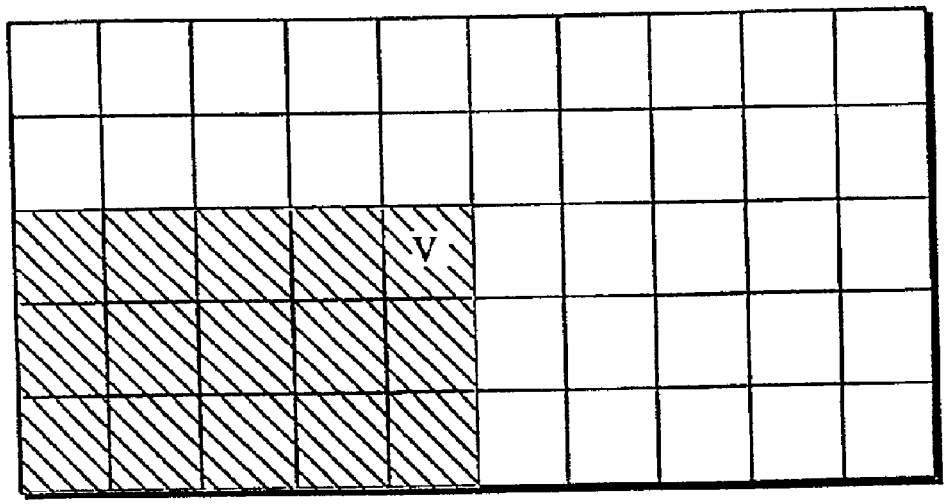
FIG. 7 is a drawing for explaining an expansion process of a halftone-dot area.

A halftone-dot area extension unit 4444 performs an extension process of a halftone-dot area, based on the output signal A2 of the isolated pixel count unit 4443. This extension process aims to prevent a pixel from being misjudged as not to be in a halftone-dot area in some cases, a specific example of which is shown in FIG. 7. FIG. 7 shows that the target pixel V is present at the periphery of a halftone-dot area (shaded part in the figure). In such a case, a count value by the isolated pixel count unit 4443 can be below the threshold REF3, although the target pixel V is in the halftone-dot area.

Specifically, the halftone-dot area extension unit 4444 sets a window of a predetermined size with the target pixel as the center. When a pixel at a predetermined position within the window (hereafter referred to as a "reference pixel") is judged to be in a halftone-dot area, the halftone-dot area extension unit 4444 judges that the target pixel is in the halftone-dot area as well. A pixel at any appropriate position can be set as a reference target. In this setting, however, the width of a window for use in the halftone-dot area extension process, image resolution, and the like should be taken into consideration. The halftone-dot area extension process may be performed with only one reference pixel. However, it is more preferable to set a plurality of reference pixels surrounding a target pixel in a plurality of directions with a certain distance therefrom. In this case, a logical-OR of these set reference pixels is taken, and the target pixel is judged to be in a halftone-dot area when one of the plurality of reference pixels surrounding the target pixel is in the halftone-dot area.

The above processing performed by the halftone-dot detection unit 444 results in a signal S5 finally being outputted. The output signal S5 being "high" indicates that the target pixel is in a halftone-dot area, whereas the output signal S5 being "low" indicates the other cases.

Figure 8:
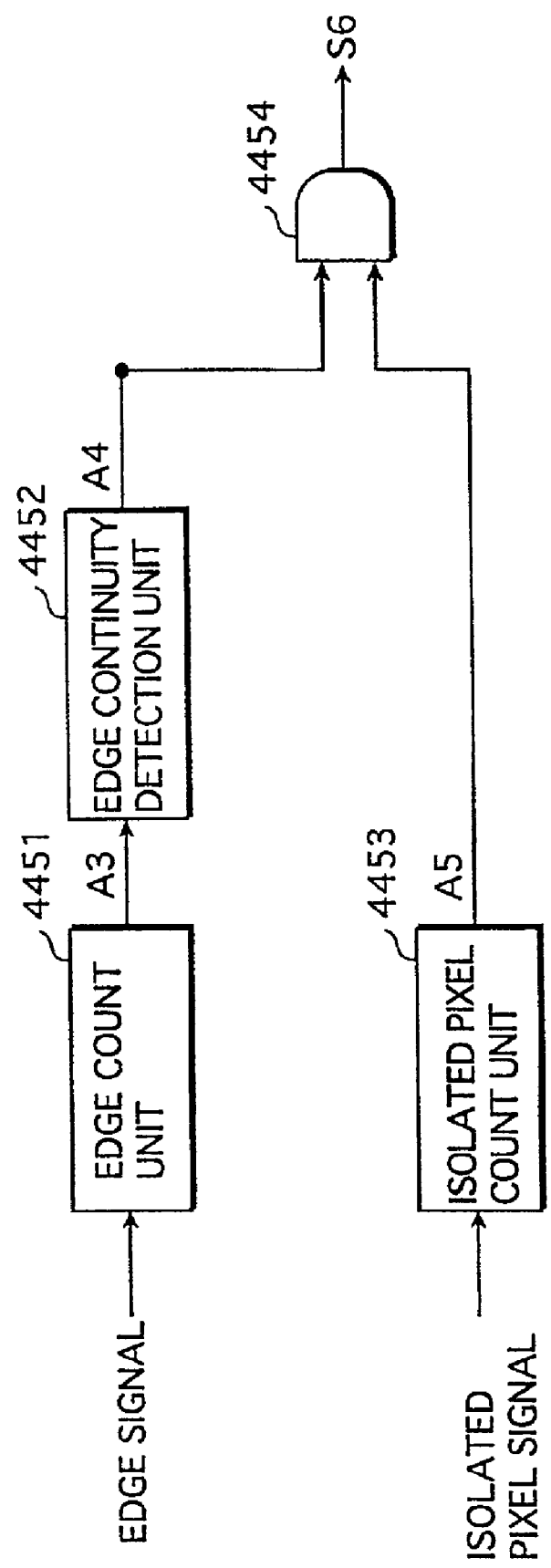
FIG. 8 shows the construction of a character-halftone area detection unit 445.

Referring back to FIG. 4, the character-halftone area detection unit 445 judges whether a target pixel can be predicted to be in an edge area of a character that is present on a halftone-dot area. FIG. 8 shows the construction of the character-halftone area detection unit 445. The character-halftone area detection unit 445 includes an edge count unit 4451, an edge continuity detection unit 4452, an isolated pixel count unit 4453, and an AND-circuit 4454.

The edge count unit 4451 receives an input edge signal, and outputs a signal A3. Here, an "edge signal" is generated in a similar manner as an output signal S4 of the character edge detection unit 443. This signal is used to judge whether a target pixel is in an edge area of a character. It should be noted here that the edge signal generation unit 447 that outputs an edge signal to the character-halftone area detection unit 445 uses a threshold that differs from the threshold REF2 used by the character edge detection unit 443, to judge whether the target pixel is in an edge area of a character. As a result, a signal that is slightly different from the output signal S4 is inputted as an edge signal. To be more specific, the edge signal generation unit 447 uses a threshold that is smaller than the threshold REF2, so as to detect that a pixel is in an edge area of a character even when the degree of change in brightness is small. This is due to the following reason. In an edge area of a character that is present on a halftone-dot area, a character edge is present in a background of a halftone-dot image. The edge amount in this case is relatively small compared with when the character edge is present in a plain (white) background. It is preferable, therefore, to set the threshold smaller so as to be able to detect the character edge easily.

The edge count unit 4451 sets a window of a predetermined size with a target pixel as the center, and counts the number of pixels included in an edge area of a character within the window, based on the input edge signal. Note that a pixel that is judged to be in an edge area of a character based on the edge signal is hereafter referred to as an "edge pixel". When the count value is above a predetermined threshold REF4, the edge count unit 4451 sets its output signal A3 at "high".

The edge continuity detection unit 4452 judges the continuity of edge pixels present around the target pixel, and outputs a signal A4, when the output signal A3 of the edge count unit 4451 is "high". This judgment relating to the continuity of the pixels is performed to minimize misjudgment of a type of a target pixel. In an edge area of a character that is present on a halftone-dot area, edge pixels are highly likely to be positioned continuously. Even when the number of the edge pixels is above the threshold, these edge pixels may not correspond to an edge area of a character if the continuity of the edge pixels is low. Also, it may be possible that the edge pixels correspond to pixels in a halftone-dot area that comes in contact with a character.

To be more specific, the edge continuity detection unit 4452 sets a window of a predetermined size with a target pixel as the center when the target pixel corresponds to an edge pixel, and judges the continuity of edge pixels present in the window. The edge continuity detection unit 4452 outputs a signal A4 set at "high", when judging that the edge continuity of the edge pixels satisfies a predetermined requirement. As one example, the judgment of the edge continuity can be performed in the following way. Assuming that a window of 5*5 pixels including a target pixel V33 is set as shown in FIG. 6 (the pixel V33 corresponds to an edge pixel as described above), the edge continuity is detected when any one of the following eight conditions is satisfied.

The conditions are: (1) pixels V11 and V22 are edge pixels; (2) pixels V13 and V23 are edge pixels; (3) pixels V15 and V24 are edge pixels; (4) pixels V34 and V35 are edge pixels; (5) pixels V44 and V55 are edge pixels; (6) pixels V43 and V53 are edge pixels; (7) pixels V42 and V51 are edge pixels; and (8) pixels V31 and V32 are edge pixels. When one of these conditions is satisfied, the edge continuity detection unit 4452 sets its output signal A4 at "high". It should be noted that this judgment criterion of the edge continuity is one example, and other methods can instead be employed.

On the other hand, the isolated pixel count unit 4453 sets a window of a predetermined size with a target pixel as the center, and counts the number of isolated pixels within the window, based on an isolated pixel signal. When the count number of the isolated pixels is below a threshold REF5, the isolated pixel count unit 4453 sets its output signal A5 at "high". The output signal A1 of the isolated pixel detection unit 4442 (see FIG. 5) can be used as the isolated pixel signal, or the isolated pixel signal can be generated individually.

It should be noted that the number of isolated pixels in an edge area of a character that is present on a halftone-dot area may be counted under the same condition (a window width, a threshold, and the like) as for the isolated pixel count unit 4443 in the halftone-dot detection unit 444. Alternatively, the condition may be changed as follows. For example, a value that differs from the threshold REF3 used by the isolated pixel count unit 4443 may be set as the threshold REF5 used by the isolated pixel count unit 4453. Also, the size of the window may be changed. In any case, it is preferable to set an appropriate condition considering the image resolution and the like.

The AND-circuit 4454 sets its output signal S6 at "high" when the output signals A4 and A5 both are "high". Therefore, the output signal S6 being "high" indicates that the target pixel is predicted to be in an edge area of a character that is present on a halftone-dot area. As described later, the output signal S6 is inputted into the AND-circuit 473, and when the output signal S10 of the AND-circuit 473 is "high", the target pixel is judged to be in an edge area of a character that is present on a halftone-dot area.

Referring back to FIG. 4, the color area signal generation unit 446 sets a window of a predetermined size with a target pixel as the center, based on the output signal S3 of the color pixel signal generation unit 442. By counting the number of color pixels within the window, the color area signal generation unit 446 outputs a signal S7 indicating whether an area including the target pixel is a color area or not. To be more specific, the color area signal generation unit 446 sets its output signal S7 at "high" when the count number of the color pixels is above a predetermined threshold REF6, and sets its output signal S7 at "low" in the other cases. The output signal S7 being "high" indicates that the target pixel is in a color area.

The following describes input and output to and from each logical circuit.

Into an AND-circuit 471, the output signal S4 of the character edge detection unit 443, the output signal S5 of the halftone-dot detection unit 444 that has been inverted, and the output signal S6 of the character-halftone area detection unit 445 that has been inverted are inputted. Therefore, the output signal S8 of the AND-circuit 471 being "high" indicates that the target pixel is in an edge area of a character that is present on areas other than a halftone-dot area.

Into an AND-circuit 472, the output signal S5 of the halftone-dot detection unit 444 and the output signal S6 of the character-halftone area detection unit 445 that have been inverted are inputted. Therefore, the output signal S9 of the AND-circuit 472 being "high" indicates that the target pixel is in a halftone-dot area.

Into an AND-circuit 473, the output signal S4 of the character edge detection unit 443, the output signal S5 of the halftone-dot detection unit 444, and the output signal S6 of the character-halftone area detection unit 445 are inputted. Therefore, the output signal S10 of the AND-circuit 473- being "high" indicates that the target pixel is in an edge area of a character that is present on a halftone-dot area as described above. The character edge detection unit 443, the halftone-dot detection unit 444, the character-halftone area detection unit 445, and the AND-circuit 473 are involved in a final judgment as to whether the target pixel is in an edge area of a character that is present on a halftone-dot area.

Into an AND-circuit 474, the output signal S3 of the color pixel signal generation unit 442 and the output signal S8 of the AND-circuit 471 are inputted. The signal S8 is set at "high" when the target pixel is in an edge area of a character that is not on a halftone-dot area. Therefore, the output signal S13 of the AND-circuit 474 being "high" indicates that the target pixel is in an edge area of a color character.

Into an AND-circuit 475, the output signal S3 of the color pixel signal generation unit 442 that has been inverted and the output signal S8 of the AND-circuit 471 are inputted. Therefore, the output signal S14 of the AND-circuit 475 being "high" indicates that the target pixel is in an edge area of a black character.

Into an AND-circuit 476, the output signal S7 of the color area signal generation unit 446 and the output signal S9 of the AND-circuit 472 are inputted. Therefore, the output signal S15 of the AND-circuit 476 being "high" indicates that the target pixel is in a color halftone-dot area.

On the other hand, into an AND-circuit 477, the output signal S7 of the color area signal generation unit 446 that has been inverted and the output signal S9 of the AND-circuit 472 are inputted. Therefore, the output signal S16 of the AND-circuit being "high" indicates that the target pixel is in a black halftone-dot area.

Into an AND-circuit 478, the output signal S7 of the color area signal generation unit 446 and the output signal S10 of the AND-circuit 473 are inputted. Therefore, the output signal S11 of the AND-circuit 478 being "high" indicates that the target pixel is in an edge area of a character that is present on a color halftone-dot area.

On the other hand, into an AND-circuit 479, the output signal S7 of the color area signal generation unit 446 that has been inverted and the output signal S10 of the AND-circuit 473 are inputted. Therefore, the output signal S12 of the AND-circuit 479 being "high" indicates that the target pixel is in an edge area of a character that is present on a black halftone-dot area.

As described above, the output signal S11 of the AND-circuit 478, or the output signal S12 of the AND-circuit 479 being "high" indicates that the target pixel is in an edge area of a character that is present on a halftone-dot area. Therefore, in addition to (a) the judgment as to whether the halftone-dot area is a color area or not, (b) the judgment as to whether the character is a color character or a black character is to be performed. Therefore, AND-circuits 480 to 483 judge whether the target pixel is in an edge area of a color character, or in an edge area of a black character, by referring to the output of the color pixel signal generation unit 442.

To be more specific, into an AND-circuit 480, the output signal S3 of the color pixel signal generation unit 442 and the output signal S11 of the AND-circuit 478 are inputted. Therefore, the output signal S17 of the AND-circuit 480 being "high" indicates that the target pixel is in an edge area of a color character that is present on a color halftone-dot area.

Also, into an AND-circuit 481, the output signal S3 of the color pixel signal generation unit 442 that has been inverted and the output signal S11 of the AND-circuit 478 are inputted. Therefore, the output signal S18 of the AND-circuit 481 being "high" indicates that the target pixel is in an edge area of a black character that is present on a color halftone-dot area.

Into an AND-circuit 482, the output signal S3 of the color pixel signal generation unit 442 and the output signal S12 of the AND-circuit 479 are inputted. Therefore, the output signal S19 of the AND-circuit 482 being "high" indicates that the target pixel is in an edge area of a color character that is present on a black halftone-dot area.

Also, into an AND-circuit 483, the output signal S3 of the color pixel signal generation unit 442 that has been inverted and the output signal S12 of the AND-circuit 479 are inputted. Therefore, the output signal S20 of the AND-circuit 483 being "high" indicates that the target pixel is in an edge area of a black character that is present on a black halftone-dot area.

The area judgment signals S13 to S20 that have been generated as described above are inputted into the image correction unit 451, and such image processing that is based on the input signals is performed as described later. Note that the signals S13 to S20 may all be "low" for a certain type of an image, and in such a case, no image processing for correction purposes is performed.

(4) Processing by the Image Correction Unit 451

The following describes the image processing performed by the image correction unit 451. When the target pixel is judged to be in an edge area of a character that is present on a halftone-dot area, the image correction unit 451 switches an operation of the image processing, by judging (a) whether the target pixel is a color pixel or not, and (b) whether the halftone-dot area is a color area or not. The specific operations of the image processing, such as edge enhancement and smoothing, are not described here because they are well known.

The table below (Table 1) shows the operations of the image processing to be performed, in accordance with whether a target pixel is a color pixel or not, and a halftone-dot area is a color area or not.

TABLE 1

| Area judgment result (judgment signal) | Image processing | | |
|---|---|---|---|
| | | CMY components | K component |
| Color character edge | S13 | Edge enhancement | Edge enhancement |
| Black character edge | S14 | Attenuation | Enhancement |
| Color halftone-dot | S15 | Smoothing | Smoothing |
| Black halftone-dot | S16 | Smoothing | Smoothing |
| Color character edge in color halftone-dot | S17 | Edge enhancement | Edge enhancement |
| Black character edge in color halftone-dot | S18 | Attenuation | Enhancement |
| Color character edge in black halftone-dot | S19 | Edge enhancement | Edge enhancement |
| Black character edge in black halftone-dot | S20 | Smoothing | Smoothing |

As Table 1 above shows, the image correction unit 451 in the present embodiment does not perform edge enhancement for a black character edge that involves (a) K component enhancement and (b) CMY component attenuation, when the target pixel is in a black character edge that is present on a black halftone-dot area (when the area judgment signal S20 is "high") This can eliminate deterioration of image quality caused when such edge enhancement for a black character edge is performed on a black pixel present in a black halftone-dot area that comes in contact with a black character that has been misjudged to be a pixel in an edge area of a black character present on a black halftone-dot area.

Note that Table 1 above shows that smoothing is performed on a pixel that is judged to be in an edge area of a black character that is present on a black halftone-dot area. Alternatively, normal edge enhancement without involving (a) K component enhancement and (b) CMY component attenuation may be performed on the pixel that is judged to be in an edge area of a black character that is present on a black halftone-dot area, or image processing may not be performed on the pixel a tall. This is because a drastic color change in a halftone-dot area can be prevented by at least avoiding the K component enhancement and the CMY component attenuation. Note that is it considered more preferable not to perform any image processing than to perform the above normal processing, because an enhanced halftone-dot part may increase coarseness of an edge area of a character in some cases, while color change may be decreased.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus comprising:
an acquisition unit for acquiring image data that includes a plurality of pixels, each of which is set as a target pixel to be judged;
a color pixel judgment unit for judging whether the target pixel is a color pixel, the color pixel being a pixel other than a monochrome pixel;
a color area judgment unit for judging whether the target pixel is in a color area that includes a plurality of color pixels, by referring to a judgment result of the color pixel judgment unit;
a character-halftone judgment unit for judging whether the target pixel is in an edge area of a character that is present on a halftone-dot area; and
a switch unit for switching, when a judgment result of the character-halftone judgment unit is affirmative, an operation of image processing to be performed on the target pixel in accordance with a judgment result of the color pixel judgment unit and a judgment result of the color area judgment unit.

2. The image processing apparatus of claim 1,
wherein the character-halftone judgment unit includes:
an edge judgment unit for judging whether the target pixel is in an edge area of a character; and
an isolated pixel judgment unit for judging whether the target pixel corresponds to an isolated pixel, and
the character-halftone judgment unit judges whether the target pixel is in an edge area of a character that is present on a halftone-dot area, by referring to a judgment result of the edge judgment unit and a judgment result of the isolated pixel judgment unit.

3. The image processing apparatus of claim 2,
wherein the character-halftone judgment unit includes:
an edge continuity judgment unit for judging a continuity of pixels that are each judged to be in an edge area of a character, by referring to a judgment result of the edge judgment unit relating to a plurality of pixels in a first window of a predetermined size that includes the target pixel; and
an isolated pixel counter for counting a number of isolated pixels in a second window of a predetermined size, by referring to a judgment result of the isolated pixel judgment unit relating to the plurality of pixels in the second window,
wherein the character-halftone judgment unit judges whether the target pixel is in an edge area of a character that is present on a halftone-dot area, by referring to a judgment result of the edge continuity judgment unit and the number of isolated pixels counted by the isolated pixel counter.

4. The image processing apparatus of claim 2,
wherein the isolated pixel judgment unit judges whether the target pixel corresponds to an isolated pixel, by referring to brightness of a plurality of pixels in a window of predetermined size that includes the target pixel.

5. The image processing apparatus of claim 1,
wherein the switch unit switches the operation of the image processing between operations of (a) performing edge enhancement and (b) not-performing edge enhancement.

6. The image processing apparatus of claim 1,
wherein the switch unit switches the operation of the image processing to be performed on the target pixel, to an operation of not performing edge enhancement that involves (a) attenuation of color components and (b) enhancement of black components, when the color pixel judgment unit judges that the target pixel is not a color pixel and the color area judgment unit judges that the target pixel is not in a color area.

7. An image forming apparatus comprising:
an acquisition unit for acquiring image data that includes a plurality of pixels, each of which is set as a target pixel to be judged;

a color pixel judgment unit for judging whether the target pixel is a color pixel, the color pixel being a pixel other than a monochrome pixel;

a color area judgment unit for judging whether the target pixel is in a color area that includes a plurality of color pixels, by referring to a judgment result of the color pixel judgment unit;

a character-halftone judgment unit for judging whether the target pixel is in an edge area of a character that is present on a halftone-dot area;

a selector for selecting, when a judgment result of the character-halftone judgment unit is affirmative, an operation of image processing to be performed on the target pixel in accordance with a judgment result of the color pixel judgment unit and a judgment result of the color area judgment unit;

an image correction unit for correcting the image data, in accordance with a selection result of the selector; and an image forming unit for forming an image, based on the image data corrected by the image correction unit.

8. The image forming apparatus of claim 7, wherein the character-halftone judgment unit includes:

an edge judgment unit for judging whether the target pixel is in an edge area of a character; and an isolated pixel judgment unit for judging whether the target pixel corresponds to an isolated pixel, wherein the character-halftone judgment unit judges whether the target pixel is in an edge area of a character that is present on a halftone-dot area, by referring to a judgment result of the edge judgment unit and a judgment result of the isolated pixel judgment unit.

9. The image forming apparatus of claim 8, wherein the character-halftone judgment unit includes:

an edge continuity judgment unit for judging a continuity of pixels that are each judged to be in an edge area of a character, by referring to a judgment result of the edge judgment unit relating to a plurality of pixels in a first window of a predetermined size that includes the target pixel; and an isolated pixel counter for counting a number of isolated pixels in a second window of a predetermined size, by referring to a judgment result of the isolated pixel judgment unit relating to the plurality of pixels in the second window, wherein the character-halftone judgment unit judges whether the target pixel is in an edge area of a character that is present on a halftone-dot area, by referring to a judgment result of the edge continuity judgment unit and the number of isolated pixels counted by the isolated pixel counter.

10. The image forming apparatus of claim 8, wherein the isolated pixel judgment unit judges whether the target pixel corresponds to an isolated pixel, by referring to brightness of a plurality of pixels in a window of a predetermined size that includes the target pixel.

11. The image forming apparatus of claim 7, wherein the selector selects the operation of the image processing from operations of (a) performing edge enhancement and (b) not-performing edge enhancement.

12. The image forming apparatus of claim 7, wherein the selector selects the operation of the image processing to be performed on the target pixel, as an operation of not-performing edge enhancement that involves (a) attenuation of color components and (b) enhancement of black components, when the color pixel judgment unit judges that the target pixel is not a color pixel and the color area judgment unit judges that the target pixel is not in a color area.

13. An image processing method comprising:

an acquisition step for acquiring image data that includes a plurality of pixels, each of which is set as a target pixel to be judged;

a color pixel judgment step for judging whether the target pixel is a color pixel, the color pixel being a pixel other than a monochrome pixel;

a color area judgment step for judging whether the target pixel is in a color area that includes a plurality of color pixels, by referring to a judgment result in the color pixel judgment step;

a character-halftone judgment step for judging whether the target pixel is in an edge area of a character that is present on a halftone-dot area; and a selection step for selecting, when a judgment result in the character-halftone judging step is affirmative, an operation of image processing to be performed on the target pixel in accordance with a judgment result in the color pixel judging step and a judgment result in the color area judging step.

14. The image processing method of claim 13, wherein the character-halftone judgment step includes:

an edge judgment sub-step for judging whether the target pixel is in an edge area of a character; and an isolated pixel judgment sub-step for judging whether the target pixel corresponds to an isolated pixel, wherein in the character-halftone judgment step, whether the target pixel is in an edge area of a character that is present on a halftone-dot area is judged, by referring to a judgment result in the edge judgment sub-step and a judgment result in the isolated pixel judgment sub-step.

15. The image processing method of claim 14, wherein the character-halftone judgment step includes:

an edge continuity judgment sub-step for judging a continuity of pixels that are each judged to be in an edge area of a character, by referring to a judgment result in the edge judgment step relating to a plurality of pixels in a first window of a predetermined size that includes the target pixel; and an isolated pixel count sub-step for counting a number of isolated pixels in a second window of a predetermined size, by referring to a judgment result in the isolated pixel judgment step relating to the plurality of pixels in the second window, wherein in the character-halftone judgment step, whether the target pixel is in an edge area of a character that is present on a halftone-dot area is judged, by referring to a judgment result in the edge continuity judgment sub-step and the number of isolated pixels counted in the isolated pixel count sub-step.

16. The image processing method of claim 14, wherein in the isolated pixel judgment step, whether the target pixel corresponds to an isolated pixel is judged, by referring to brightness of a plurality of pixels in a window of a predetermined size that includes the target pixel.

17. The image processing method of claim 13, wherein in the selection step, the operation of the image processing is selected from operations of (a) performing edge enhancement and (b) not-performing edge enhancement.

18. The image processing method of claim 13, wherein in the selection step, the operation of the image processing to be performed on the target pixel is selected as an operation of not performing edge enhancement that involves (a) attenuation of color components and (b) enhancement of black components, when the target pixel is judged not to be a color pixel in the color pixel judgment step and the target pixel is judged not to be in a color area in the color area judgment step.

* * * * *